United States Patent [19]
Mackinlay et al.

[11] Patent Number: 5,384,908
[45] Date of Patent: Jan. 24, 1995

[54] AVOIDING OSCILLATION IN INTERACTIVE ANIMATION

[75] Inventors: Jock D. Mackinlay; George G. Robertson, both of Palo Alto, Calif.

[73] Assignee: Xerox Corporation, Stamford, Conn.

[21] Appl. No.: 814,138

[22] Filed: Dec. 30, 1991

[51] Int. Cl.$^6$ .............................................. G06F 15/00
[52] U.S. Cl. ..................................... 395/152; 395/128
[58] Field of Search ............... 395/128, 152; 340/725; 345/121, 122

[56] References Cited

U.S. PATENT DOCUMENTS

| | | | |
|---|---|---|---|
| 4,580,782 | 4/1986 | Ochi | 273/86 R |
| 5,046,026 | 9/1991 | Tolomei | 395/152 |
| 5,276,785 | 1/1994 | Mackinlay et al. | 395/127 |

FOREIGN PATENT DOCUMENTS

| | | | |
|---|---|---|---|
| 435601A2 | 7/1991 | European Pat. Off. | H04N 1/387 |
| 447095A2 | 9/1991 | European Pat. Off. | G06F 15/72 |

OTHER PUBLICATIONS

Airey, J. M. Rohlf, J. H., and Brooks, Jr., F. P., "Towards Image Realism with Interactive Update Rates in Complex Virtual Building Environments," *Computer Graphics*, Mar. 1990, vol. 24, No. 2, pp. 41–50.

Fournier, A., Fussell, D., Carpenter, L., "Computer Rendering of Stochastic Models," *Communications of the ACM*, Jun. 1982, vol. 25, No. 6, pp. 371–373.

Bergman, L., Fuchs, E., and Spack, S., "Image Rendering by Adaptive Refinement," Proceedings of SIG-GRAPH '86 (Dallas, Tex.), *Computer Graphics*, vol. 20, No. 4, Aug. 1986, pp. 29–34.

Foley, J. D., van Dam, A., Feiner, S. K., and Hughes, J. F., *Computer Graphics—Principles and Practice*, 2d Ed., Addison-Wesley, Reading, Mass., 1990, 1057–1081.

Clark, J. H., "Hierarchical Geometric Models for Visible Surface Algorithms," *Communications of the ACM*, vol. 19, No. 10, Oct. 1976, pp. 547–554.

Robertson, George G., Mackinlay, Jock D., and Card, S. K., "Cone Trees: Animated 3D Visualizations of Hierarchical Information," Report SSL-90-79, System Sciences Laboratory, Xerox Corporation Palo Alto Resarch Center, Apr. 1991, pp. 1–9.

*Primary Examiner*—Robert W. Beausoliel, Jr.
*Assistant Examiner*—Stephen C. Elmore

[57] ABSTRACT

Interactive animation is performed in cycles, between which detail control data is communicated so that oscillation of detail can be avoided by maintaining detail. A cycle obtains data indicating the speed with which it renders an image and stores detail control data that depends on the rendering speed. The detail control data indicates a level of detail at which an image is presented in a following cycle. The level of detail can be used in rendering the image by producing data defining the image from data defining a scene. The data defining the scene can include level defining data indicating a rendering at each of a set of levels. The detail control data also includes maintenance information for use in determining whether to maintain detail. In one approach, the maintenance information indicates whether a level of detail is being maintained and a hold speed; the current rendering speed is compared with the hold speed and with a threshold speed in deciding whether to maintain detail. In another approach, the maintenance information also indicates a level of detail being maintained, so that if the current cycle has the same level of detail and rendering speed, the level and speed are continued. In this approach, the level of detail and rendering speed can be values on a detail/speed scale to permit direct comparison, and decisions about increasing and decreasing detail can be based on the relation between detail and speed, with the objective of providing a level of detail at which the designer's preferred rendering speed can be achieved.

18 Claims, 7 Drawing Sheets

AVOIDING OSCILLATION IN INTERACTIVE ANIMATION

BACKGROUND OF THE INVENTION

The present invention relates to interactive animation techniques that adaptively select the detail with which a scene is presented.

Animation techniques have been proposed that adaptively select a level of detail by using a previous scene's rendering time as an estimate of a current scene's rendering time. A scene's rendering time at a given level of detail is the time necessary to obtain data defining an image with that level of detail so that the image can be presented. Because the previous scene and the current scene are often similar, the previous scene's rendering time at a given level of detail often provides a good estimate of the current scene's rendering time at the same level of detail. The scenes can be defined at several possible levels of detail. If a scene is rendered too slowly for smooth animation, a level with less detail can be chosen for the next scene. If a scene is rendered more quickly than necessary for smooth animation, a level with greater detail can be chosen for the next scene. Determining a level of detail in this way involves no additional computation that might affect animation rates and can be applied to any rendering techniques on any machine presenting animated scenes.

SUMMARY OF THE INVENTION

One aspect of the invention deals with a basic problem in the adaptive animation techniques described above. Because the rendering time of the previous scene affects the detail of the next scene, the animation can oscillate between detailed and simplified views. Such an oscillation appears as a blink of object detail and is quite noticeable to a viewer.

This aspect is further based on the discovery of a technique that alleviates the oscillation problem. The technique can be used to maintain for several animation cycles the detail with which a scene is rendered.

The processor performing the animation cycles communicates information between cycles by storing and retrieving detail control data. A cycle obtains data indicating its rendering speed and uses the rendering speed data to obtain detail control data. The detail control data is stored so that the following cycle can access and use it in rendering an image and in storing detail control data for the next cycle. If appropriate, a cycle's detail control data can be identical to that stored by a previous cycle, in which case stored detail control data can be left unchanged.

The detail control data includes detail information indicating the detail with which to present an image and maintenance information for use in determining whether to maintain presentation with the indicated detail. For example, each scene can have a number of preassigned levels of detail, so that the detail information can be an identifier of a level of detail, such as a numerical identifier. The maintenance information can indicate that the indicated level is being maintained, the speed of rendering a preceding image at the indicated level of detail, or other information that can be used in determining whether to maintain the indicated level.

While detail is maintained in the manner described above, an event may occur that makes it inappropriate to continue maintaining detail. For example, a scene may change in response to a user signal.

This problem can be solved by using rendering speed data. The rendering speed data of a current animation cycle can be used, for example, to determine whether the speed is slower than a threshold speed for satisfactory animation. If so, detail can be decreased in the next animation cycle to bring the speed above threshold. On the other hand, if the current cycle's rendering speed is not slower than threshold and is above the rendering speed of a previous animation cycle that was also not slower than threshold, then detail can be increased to find a speed closer to threshold.

When the detail with which an image is presented is less than the detail with which a preceding image was presented, detail control data can be stored so that the image continues to be presented with less detail. For example, an identifier of a level of detail can be stored, together with rendering speed data indicating the speed at which the level was rendered in a preceding animation cycle. A subsequent animation cycle can present an image at the same level of detail and, if its rendering speed is approximately the same as the preceding cycle's rendering speed, can leave the detail control data unchanged to maintain the level of detail.

Instructions implementing the technique can be included in a software product. Such instructions could then be executed by a processor that produces interactive animation sequences. Similarly, a machine implementing the technique could include such instructions and a processor that executes them.

The following description, the drawings, and the claims further set forth these and other aspects, objects, features, and advantages of the invention.

DETAILED DESCRIPTION

A. Conceptual Framework

Figure 1:
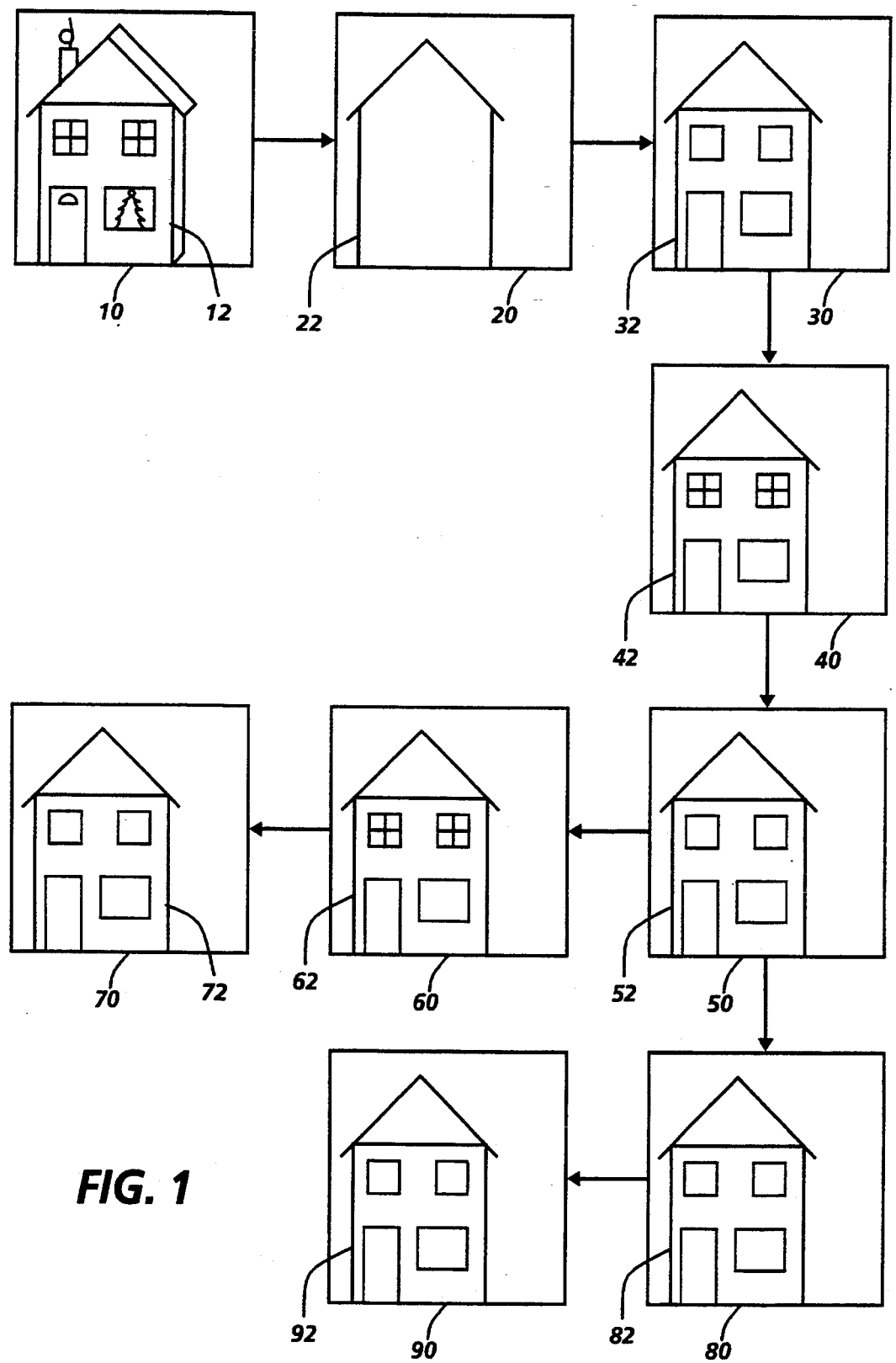
FIG. 1 is a schematic diagram showing two sequences of scene presentations, with one sequence including an oscillation and the other avoiding oscillation.

The following conceptual framework is helpful in understanding the broad scope of the invention, and the terms defined below have the indicated meanings throughout this application, including the claims.

"Data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF."

"Data" includes data existing in any physical form, and includes data that is transitory or is being stored or transmitted. For example, data could exist as an electromagnetic or other transmitted signal or as a signal stored in electronic, magnetic, or other form.

A "data storage medium" or "storage medium" is a physical medium that stores data.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer data from one of the components to the other.

"Memory" is any component, combination of components, or system that can store data, and may include local and remote memory and input/output devices.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "operates on" data by performing an operation that includes obtaining resulting data that depends on the data operated on. For example, the resulting data could result from an operation that accesses the data operated on or from a logical or numerical operation on the data operated on.

A processor "uses" data in performing an operation when the result of the operation depends on the value of the data.

An "instruction" is an item of data that a processor can use to determine its own operation. A processor "executes" a set of instructions when it uses the instructions to determine its operations.

Data "indicates" an attribute when the data has a value that depends on the existence of the attribute or on a measure of the attribute.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

An item of data "includes" information indicating an attribute if data indicating the attribute can be obtained by operating on the item of data. Conversely, an item of information that indicates an attribute can be said to "include" an item of data if data indicating the attribute can be obtained by operating on the item of data.

"User input means" is means for providing signals based on actions of a user. User input means can include one or more "user input devices" that provide signals based on actions of a user, such as a keyboard or a mouse. The set of signals provided by user input means can therefore include data indicating mouse operation and data indicating keyboard operation. Signals from user input means may include a "request" for an operation, in which case the system may perform the requested operation in response.

An "image" is a pattern of light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

Data "defines" an image when the data includes sufficient information to produce the image, such as by presenting it on a display.

A wide variety of display techniques for data processing systems are available including, for example, various graphical user interfaces, but, despite their diversity, these techniques tend to have certain common characteristics. One fundamental common characteristic is that a display produces human perceptions. In this application, the term "display feature" refers to any human perception produced by a display.

A "display object" or "object" is a display feature that is perceptible as a coherent unity.

An image "includes" an object if presentation of the image can produce perception of the object.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

An "animation loop" is a repeated operation in which each repetition presents an image and in which objects and other display features in each image appear to be continuations of objects and display features in the next preceding image. If the user is providing signals through a user input means, the signals can be queued as events and each loop can handle some events from the queue. An "animation cycle" is a single iteration of an animation loop.

A "scene" is a series of one or more images that can be presented by a sequence of animation cycles such that display features appear to continue through the scene. Data "defines" a scene when it can be used to produce data defining the images of the scene.

A "rendering" operation is an operation that uses data defining a scene to produce data defining an image. A "speed" at which a rendering operation is performed is inversely proportional to time spent performing the operation. Data is "communicated" between first and second rendering steps when the data is stored during the first rendering step and is accessed during the second rendering step.

The "detail" with which an image is presented is the quantity of information in the presented image. Information in an image can be increased by providing additional lines or objects, by providing additional variation in color, by providing variations of higher spatial frequency, and so forth. A set of images can range from "more detailed" to "simpler" if, for each image in the set except the simplest, the image's next simpler image can be obtained by reducing detail in the image and if, for each image in the set except the most detailed, the image's next more detailed image can be obtained by increasing detail in the image.

Presentation of images with a given detail is "maintained" when more than one image is presented with approximately the same quantity of information. The detail with which images are presented is "reduced" or "decreased" when a simpler image follows a more detailed image. The detail with which images are presented is "increased" when a more detailed image follows a simpler image.

A "level of detail" is a value indicating one of a set of quantities of information in an image. A designer of scenes can specify, for a given scene, a rendering of the scene at each of a set of levels of detail, such as by specifying display features presented at each of the levels.

B. General Features

Figure 2:
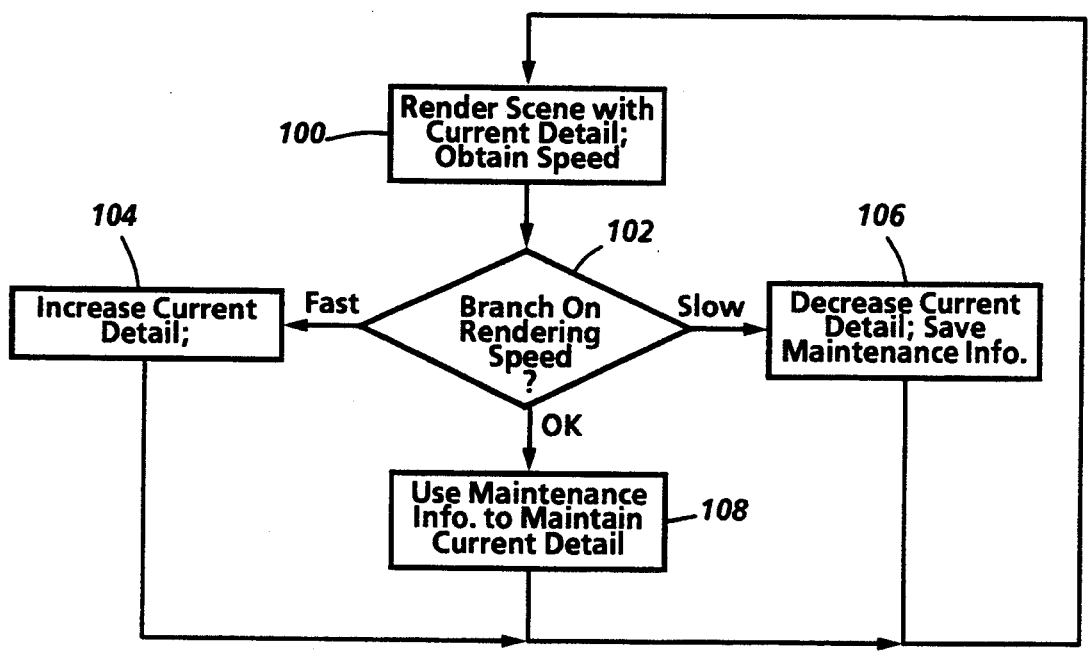
FIG. 2 is a flow chart showing general steps in avoiding oscillation.
Figure 3:
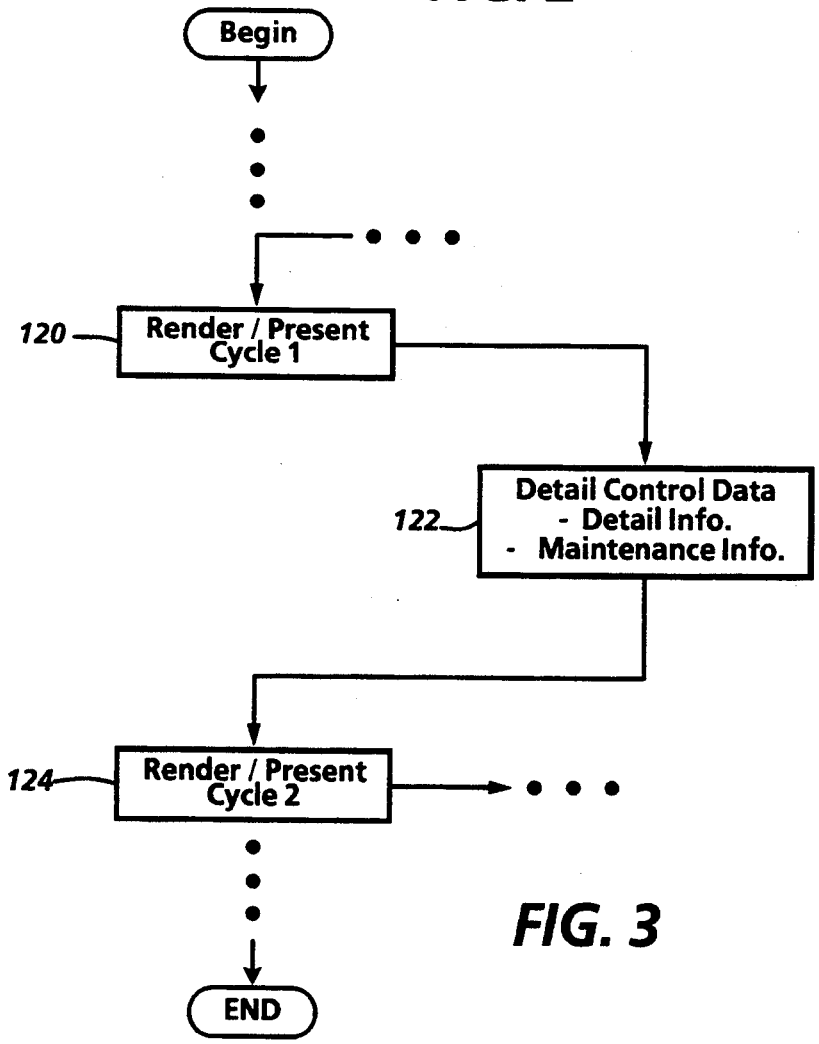
FIG. 3 is a schematic flow diagram showing communication of detail control data between consecutive rendering steps.

FIGS. 1-3 illustrate general features of the invention. FIG. 1 shows how an oscillation in an animated presentation occurs and can be avoided. FIG. 2 shows general steps in avoiding an oscillation. FIG. 3 shows a consecutive pair of animation cycles and detail control data communicated between them to avoid oscillation.

The sequences of presentations in FIG. 1 both begin with detailed image 10, in which house 12 is presented in perspective and includes a door, three windows, and a chimney, together with additional details. Detailed image 10 requires a relatively long rendering time, however, and the rendering time may be so long that it precludes effective animation.

An adaptive technique as described above, after determining that the rendering time of detailed image 10 is too long, next presents simple image 20, in which house 22 is presented only in outline. Because of its simplicity, image 20 requires relatively little rendering time.

The adaptive technique can then present images with progressively more detail until it reaches an image that cannot be rendered quickly enough to provide effective animation. Image 30 has more detail than image 20 because house 32 includes outlines of a door and of windows. Image 40 has more detail than image 30 because house 42 includes outlines of panes of glass in two windows.

Image 40 illustratively cannot be rendered quickly enough to provide effective animation. Therefore, the adaptive technique next presents image 50 in which house 52 has the same detail as house 32 in image 30. Because image 50 is simpler than image 40, it can be rendered quickly enough for effective animation.

The previous adaptive technique described above would next present image 60 with house 62 with the same detail as house 42 in image 40. Then, because image 60 cannot be rendered quickly enough, it would present image 70 with house 72 with the same detail as house 52 in image 50. In other words, the previous technique would begin an oscillation between simpler and more detailed images. FIG. 1 illustrates an oscillation between images having closely similar detail, but oscillation could also occur between images having substantially different detail.

To avoid oscillation, the technique of the invention instead presents image 80 with house 82 with the same detail as house 52 in image 50. Then, it presents image 90 with house 92 with the same detail as house 82. In other words, oscillation is avoided by continuing to present an image that is simpler than the image that cannot be rendered quickly enough. One way the adaptive technique reaches such an image is by going from a more detailed image to a simpler one. In this way, the technique can move to and then continue at the simpler level, avoiding oscillation.

FIG. 2 shows general steps in an animation loop implementing the technique of the invention. The step in box 100 renders a scene with the current detail, which can be indicated by detail information received from a preceding iteration of the loop. The rendering step produces data defining an image with the current detail, and this image can be presented as part of box 100 or at any other appropriate point in the animation loop. The rendering step also obtains data indicating rendering speed.

The step in box 102 then branches depending on the speed at which rendering was performed in box 100. As discussed below, various measurements of speed could be made and various criteria could be applied to such a measurement to determine whether the speed is too slow, too fast, or within an acceptable range.

If the speed is too fast, the step in box 104 increases the current detail so that the next iteration of box 100 renders an image with greater detail. If the speed is too slow, the step in box 106 decreases the current detail so that the next iteration of box 100 renders an image with less detail; the step in box 106 also saves maintenance information for maintaining presentation of images with the newly defined current detail. If the speed is acceptable, the step in box 108 uses maintenance information from a preceding step to maintain the current detail.

For symmetry between boxes 104 and 106, the step in box 104 could also save maintenance information. The step in box 108 could then use maintenance information saved in box 104 or in box 106 of a preceding step.

FIG. 3 shows how information can be communicated between animation cycles to avoid oscillation. The step in box 120 renders and presents an image during animation cycle 1. The step in box 122 stores detail control data, including detail information and maintenance information as described above. Then, the step in box 124 can access and use the detail control data stored in box 122 to render and present another image during animation cycle 2. As shown, the steps in FIG. 3 are part of an extended sequence of rendering steps, between each consecutive pair of which is a communicating step that stores detail control data.

C. Implementations

The general features described above could be implemented in numerous ways on various machines to provide adaptive animation without oscillation between simpler and more detailed images. The invention has currently been implemented on a Silicon Graphics IRIS workstation. In one implementation, rendering speed is maintained in relation to a threshold speed to avoid oscillation. In another implementation, rendering speed varies with the level of detail of the image.

1. System Features

Figure 4:
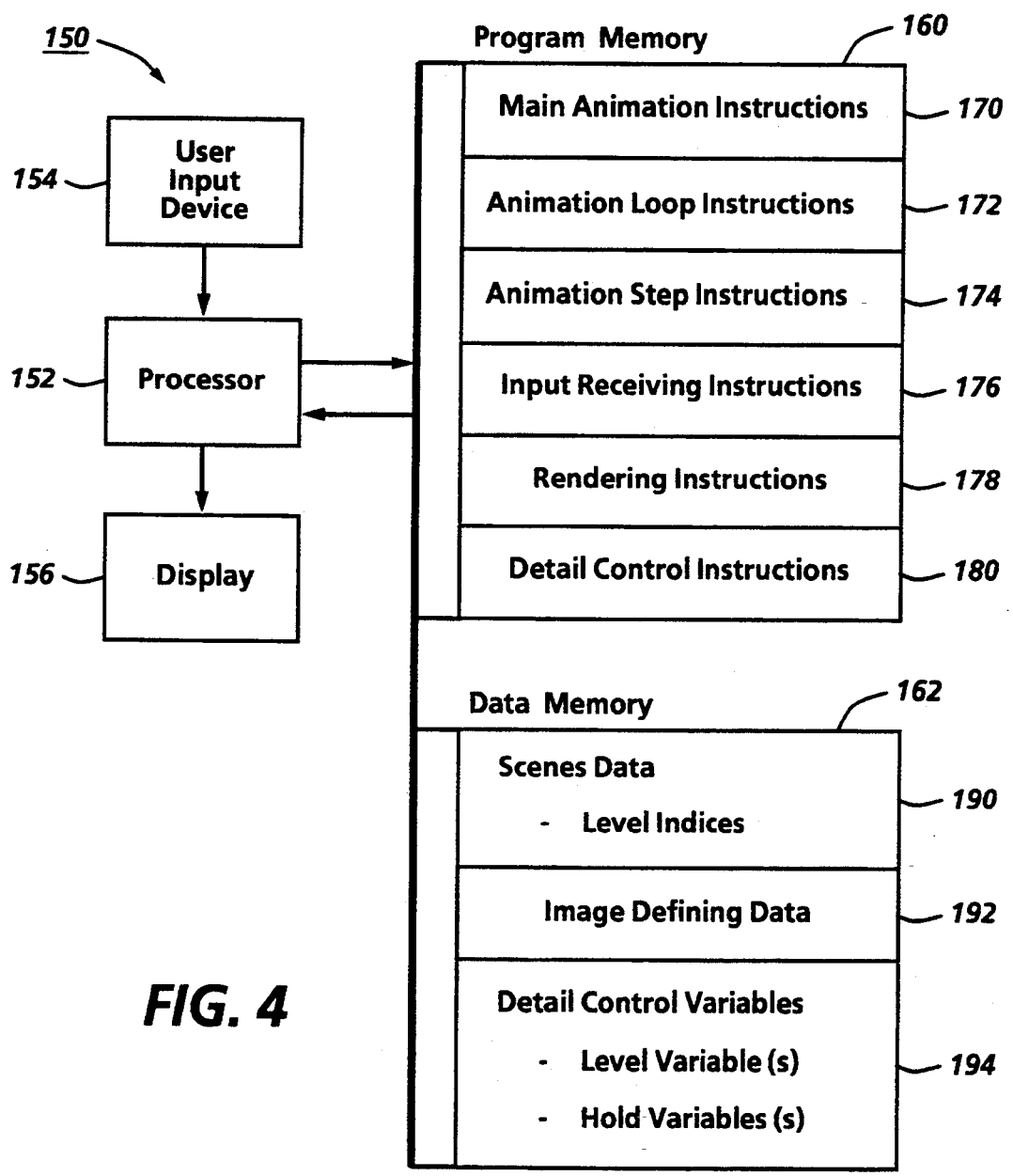
FIG. 4 is a schematic block diagram showing components of a system in which detail control data can be used to avoid oscillation.

FIG. 4 shows components of system 150 in which the general features described above can be implemented. Processor 152 is connected for receiving signals from user input device 154, such as a mouse, keyboard, joystick, or any other suitable user input device. Processor 152 is also connected for providing signals to control presentation of images on display 156.

Processor 152 is also connected for accessing program memory 160 and data memory 162. Processor 152 executes instructions from program memory 160 and, during execution, accesses data memory 162 as appropriate.

Processor 152 executes main animation instructions 170 to prepare for an animation session. Processor 152 executes animation loop instructions 172 repeatedly during an animation session following a call from main animation instructions 170. Each animation cycle calls animation step instructions 174, which in turn call input receiving instructions 176, and rendering instructions 178. Each animation cycle also calls detail control instructions 180, to control the level of detail at which images are presented.

During execution of rendering instructions 178, processor 152 accesses scenes data 190 to produce image defining data 192, which is then used to control display 156. Processor 152 also accesses detail control variables 194, including one or more level variables and one or more hold variables for use in maintaining a level of detail. Processor 152 also uses level indices in scenes data 190 to produce an image with an indicated level of detail.

2. Target Range Implementation

Figure 5:
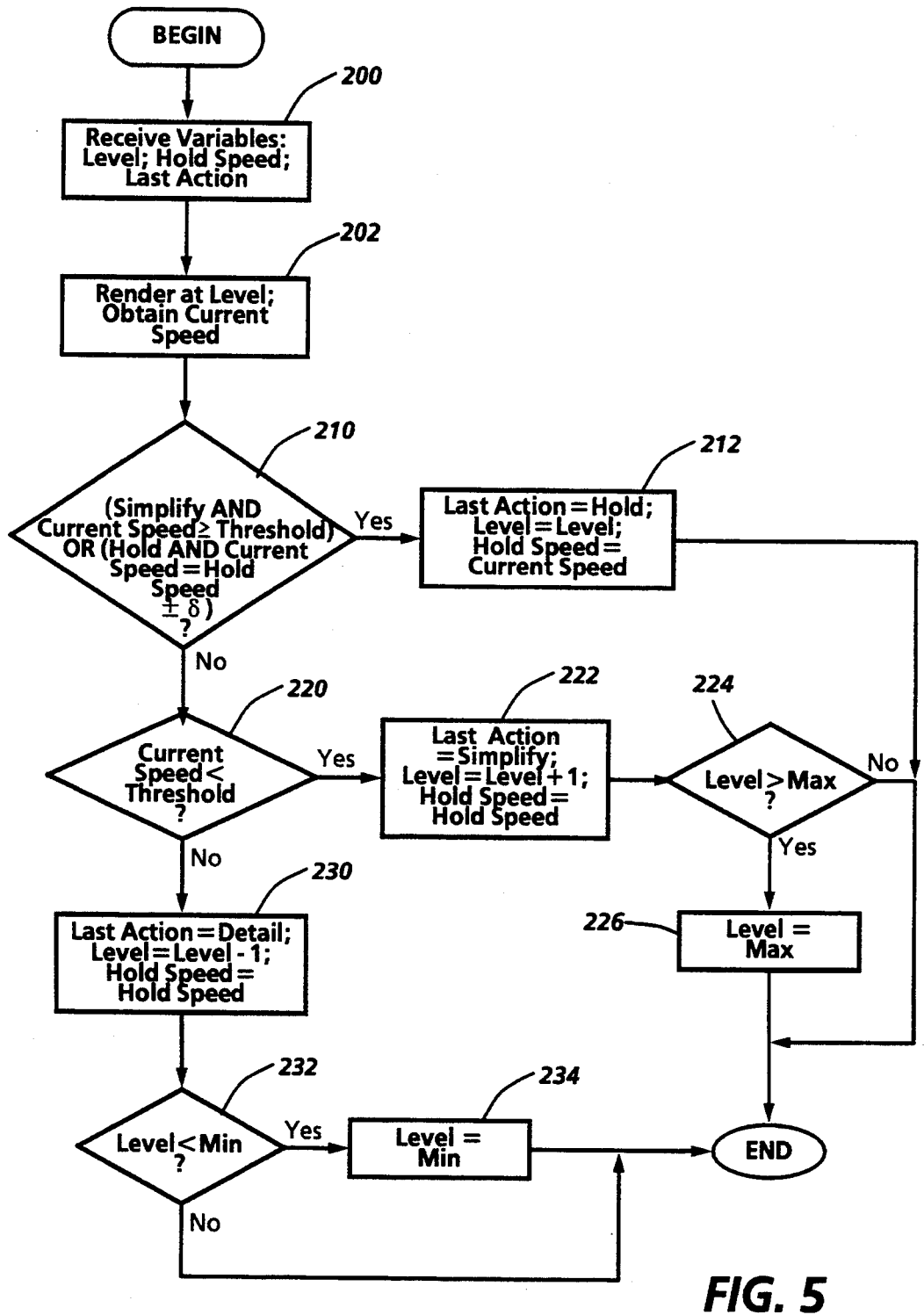
FIG. 5 is a flow chart showing steps in a technique that controls details to avoid oscillation.

FIG. 5 illustrates one example of how the invention can be implemented in system 150 in FIG. 4. In the technique of FIG. 5, detail control variables 194 include a level variable called "Level" and hold variable called "Hold Speed" and "Last Action." Each time animation step instructions 174 are called, they perform the steps shown in FIG. 5; in addition, at some point during each cycle, input receiving instructions 176 can be performed. FIG. 5 includes steps performed by detail control instructions 180.

At the beginning of each animation step, the step in box 200 receives the variables Level, Hold Rating, and Last Action. The step in box 202 then renders a scene at the level of detail indicated by Level. The speed of rendering is measured, such as by measuring the time necessary for rendering. The measurement result is used to obtain a value for the variable Current Speed, indicating the rendering speed.

The step in box 210 performs a two-part test to determine whether to hold the current level of detail. One part determines whether Last Action has the value Simplify, indicating that the previous cycle changed to a simpler level of detail, and Current Speed is greater than or equal to a threshold speed. The second part determines whether Last Action has the value Hold, indicating that the previous cycle maintained a level of detail, and Current Speed is within a constant δ of Hold Speed.

If either part of the test is met, the level can be held, so that the step in box 212 sets Last Action to indicate the value Hold, maintains Level at the same value, and sets Hold Speed to the value of Current Speed. The constant δ is used in box 210 because animation rates for a given Level may fluctuate, particularly on a multiprocessing system such as a Silicon Graphics IRIS workstation. Such fluctuation can cause an inequality between Hold Speed and Current Speed. Therefore, the constant δ provides a slightly larger interval over which a comparison can succeed.

If neither part of the test in box 210 is met, the step in box 220 determines whether the rendering speed is too slow by comparing Current Speed to Hold Speed. If so, the level of detail should be simplified, so the step in box 222 sets Last Action to the value Simplify, increments Level to indicate the next simpler level of detail, and does not change the value of Hold Speed. If the step in box 224 determines that Level has been incremented above Max, the simplest level of detail, the step in box 226 sets Level equal to Max.

If the rendering speed is not too slow and the level is not being maintained, the rendering speed may be faster than necessary. Therefore, the step in box 230 sets Last Action to the value Detail, decrements Level to indicate the next more detailed level, and does not change the value of Hold Speed. If repeated for several cycles, the step in box 230 may make the image more detailed until it is necessary to simplify it, which can lead to a hold as described above. If the step in box 232 determines the Level has been decremented below Min, the most detailed level, the step in box 234 sets Level equal to Min.

In summary, the implementation of FIG. 5 maintains a level of detail that results from simplifying if its rendering speed is above threshold, and seeks a more detailed level with a satisfactory rendering speed closer to threshold if the rendering speed becomes sufficiently faster.

3. Variable Speed Implementation

Figure 6:
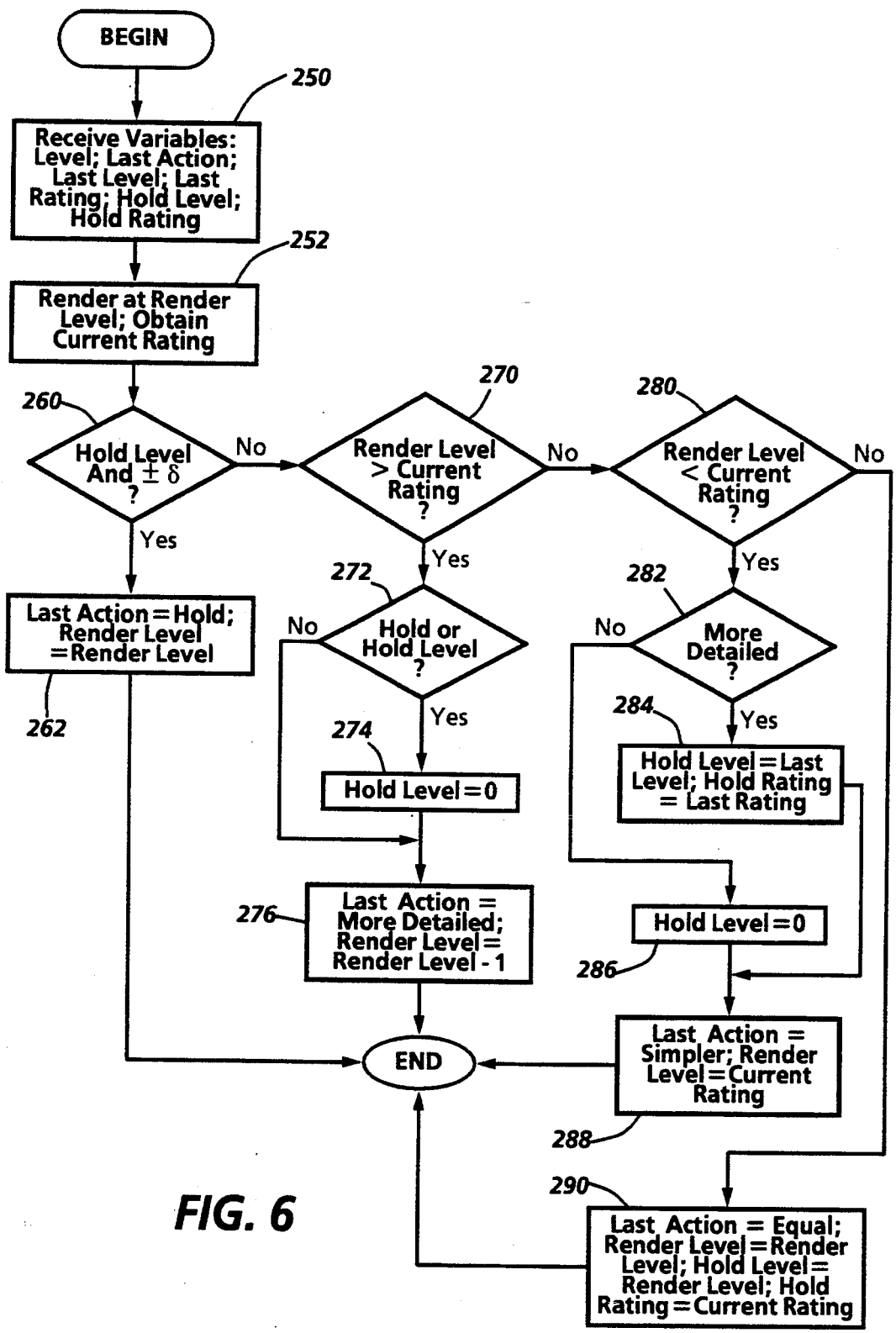
FIG. 6 is a flow chart showing steps in another technique that controls detail to avoid oscillation.
Figure 7:
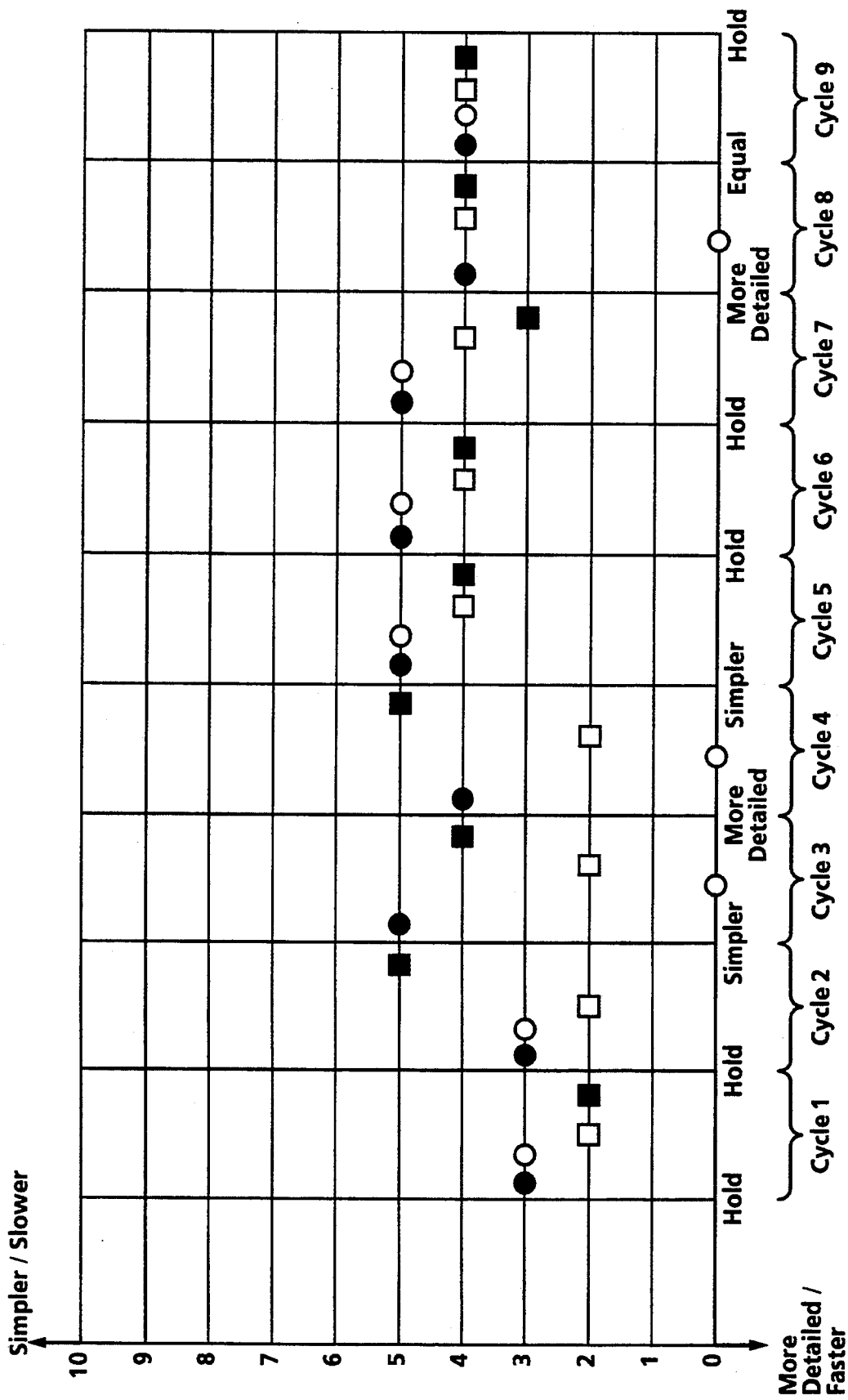
FIG. 7 is a graph showing a series of cycles according to the technique of FIG. 6.

FIGS. 6 and 7 illustrate another example of how the invention can be implemented in a system like system 150 in FIG. 4. FIG. 6 shows steps performed in this technique, and FIG. 7 shows an example of how levels of detail and rendering speeds could fluctuate during part of an animation session according to this technique.

In the technique of FIG. 6, detail control variables 194 include a level variable called "Render Level" and hold variables called "Last Action," "Last Level," "Last Rating," "Hold Level," and "Hold Rating." Each time animation step instructions 174 are called, they perform the steps shown in FIG. 6; in addition, at some point during each cycle, input receiving instructions 176 can be performed. FIG. 6 includes steps performed by detail control instructions 180.

At the beginning of each animation step, the step in box 250 receives the variables Render Level, Last Action, Last Level, Last Rating, Hold Level, and Hold Rating. The step in box 252 then renders a scene at the level of detail indicated by Render Level. The speed of rendering is measured, such as by measuring the time necessary for rendering. The measurement result is used to obtain a value for the variable Current Rating, indicating the rendering speed.

The technique of FIG. 6 employs a single detail/speed scale for levels of detail, such as Render Level, Last Level, and Hold Level, and for rendering speeds, such as Current Rating, Last Rating, and Hold Rating. This enables an animation creator to implicitly specify a desired rendering speed in specifying a level of detail. The technique of FIG. 6 seeks a stable state in which the level of detail and the rendering speed are the same. In the following description, terms such as "simpler/slower" and "more detailed/faster" refer respectively to the two directions along the detail/speed scale.

The speed side of detail/speed scale can be obtained based on perceptual considerations. Typically, people perceive smooth animation around 50 frames-per-second and extremely disjointed animation around a half a flame-per-second, which can be quite painful in interactive applications. For example, movies are presented at a rate of 24 distinct frames-per-second using a shutter to produce an effective rate of 48 frames-per-second. The actual threshold rate that results in satisfactory animation depends on additional factors such as the visual angle of each object in a scene being rendered, the velocity of each object, the precision requirements of the user's interaction, and application requirements, but some of these additional factors are negligible.

A satisfactory speed scale can be obtained by multiplying rendering time by 100 and taking the base 2 logarithm of the product. As a result of scaling with the factor of 100, a rendering time of 0.02 seconds per cycle that yields 50 flames-per-second has the value 1. The speed scale can extend upward to a maximum value 9, obtained from a rendering time of 5.25 seconds per cycle that yields 0.19 frames-per-second. Values 1-3 on the detail/speed scale thus indicate fast rendering times and detailed images, while values 7-9 indicate slow rendering speeds and simple images.

The use of a logarithmic speed scale has certain advantages. Informal experiments suggest that subjective evaluations of animation rates tend to be logarithmic. Furthermore, developers of interactive animations should find such a scale, with values 1-9, easy to understand because it provides an intuitive metric.

The step in box 260 determines whether Render Level is equal to the Hold Level and the Current Rating is within a constant $\delta$ of Hold Rating. If so, the level can be held, so that the step in box 262 sets Last Action to indicate the value Hold and maintains Render Level at the same value. The constant $\delta$ is used in box 260 because animation rates for a given Render Level may fluctuate, particularly on a multi-processing system such as a Silicon Graphics IRIS workstation. When Current Rating is near the edge of an interval in the detail/speed scale, such fluctuation can cause an inequality between Hold Rating and Current Rating. Therefore, the constant $\delta$ provides a slightly larger interval over which a comparison can succeed.

The step in box 270 determines whether Render Level is simpler/slower than Current Rating, in which case the rendering speed is faster than appropriate for the level of detail. If so, the step in box 272 determines whether Last Action has the value Hold or Render Level is equal to Hold Level. If one of these conditions is met, the step in box 274 sets Hold Level to zero, the value indicating the most detailed level of detail. This prevents an inappropriate hold by the step in box 262 when a scene has been simplified through user interaction. Finally, the step in box 276 sets Last Action to indicate the value More Detailed and decrements Render Level to indicate the next more detailed level.

The step in box 280 determines whether Render Level is more detailed/faster than Current Rating, in which case the rendering speed is slower than appropriate for the level of detail. If so, the step in box 282 determines whether Last Action has the value More Detailed, from box 276. If so, to avoid a potential oscillation, the step in box 284 sets Hold Level to Last Level and Hold Rating to Last Rating. But if Last Action does not have the value More Detailed, the step in box 286 sets Hold Level to zero, as in box 274. This prevents an inappropriate hold in box 262. In either case, the step in box 288 sets Last Action to indicate the value Simpler and changes Render Level to the value of Current Rating.

Finally, if the steps in box 270 and 280 determine that Render Level is neither more detailed/faster nor simpler/slower than Current Rating, then Render Level and Current Rating must be equal. Therefore, the step in box 290 sets Last Action to indicate the value Equal, maintains Render Level at its current value, and updates Hold Level to indicate Render Level and Hold Rating to indicate Current Rating. This step may begin a sequence of renderings at the level of detail indicated by Render Level.

The steps in boxes 262, 276, 288, and 290 in FIG. 6 can also include updating Last Level to the value of Render Level and Last Rating to the value of Current Rating. Then the animation cycle ends.

The technique in FIG. 6 could be varied in many ways. For example, the measurement of rendering speed could be obtained by measuring total rendering time; by measuring time necessary for a sample of operations; or in any other appropriate way. Different variables could be communicated between cycles, or detail control data could be passed between cycles differently, such as in an encoded form. The levels of detail and rendering speeds could be on different scales, so that the decisions about rendering speed could be made based on a more complicated comparison. Decisions to stop maintaining detail can include consideration of the number of cycles during which detail has been maintained.

During a static scene with no change in scene or viewpoint, the rendering level can be maintained at the most detailed level. Also, a progressive refinement technique can be applied to static scenes, in which the scene is rendered multiple times at increasing levels of detail. Progressive refinement techniques are described in Bergman, L., Fuchs, E., and Spack, S., "Image rendering by adaptive refinement," Proceedings of SIGGRAPH '86 (Dallas, Tex.), *Computer Graphics*, Vol. 20, No. 4, August 1986, pp. 29-34.

FIG. 7 is a graph of a sequence of animation cycles, illustrating the effects of some of the steps in FIG. 6. For each cycle, a solid circle indicates the value of of Render Level received in box 250. An open circle indicates the value of Hold Level received in box 250. An open square indicates the value of Hold Rating received in box 250. The value of Last Action received in box 250 is indicated by the word or words below the line preceding each cycle. A solid square indicates the value of Current Rating obtained in box 252. The values of Last Level and Last Rating for each cycle are simply the values of Render Level and Current Rating for the immediately preceding cycle, and are therefore not shown again.

Cycle 1 in FIG. 7 begins with Render Level and Hold Level at the value 3, with Hold Rating at the value 2, and with Last Action at the value Hold. The step in box 252 in cycle 1 obtains a value of 2 for Current Rating, so that the step in box 260 concludes that Render Level is equal to Hold Level and Current Rating is equal to Hold Rating. Therefore, the step in box 262 maintains Render Level and Last Action at the same values.

Cycle 2 begins with the same values as cycle 1, but the step in box 252 obtains a value of 5 for Current Rating. This could occur, for example, if a user requests a change in the scene that makes it more difficult to render. Therefore, the step in box 280 in cycle 2 determines that Render Level is less than Current Rating. Because Last Action does not have the value More Detailed, the step in box 286 sets Hold Level to the value zero for cycle 3. Then the step in box 288 sets Last Action to the value Simpler and Render Level for cycle 3 to the value 5, the value of Current Rating.

Cycle 3 begins with the values set by cycle 2, but the step in box 252 obtains a value of 4 for Current Rating, because cycle 2 simplified the level of detail. Therefore, the step in box 270 determines that Render Level is greater than Current Rating. The step in box 276 then sets Last Action to the value More Detailed and decrements Render Level for cycle 4 to move to the next more detailed level of detail.

Cycles 4 begins with the values set by cycle 3, but the step in box 252 obtains a value of 5 for Current Rating so that the step in box 280 determines that Render Level is less than Current Rating. Because Last Action has the value More Detailed from cycle 3, the step in box 284 updates Hold Level and Hold Rating to the current values of Last Level and Last Rating, respectively. Then, the step in box 288 sets Last Action to the value Simpler and Render Level for cycle 5 to the value 5, the value of Current Rating.

Cycles 5 and 6 each find Render Level equal to Hold Level and Current Rating equal to Hold Rating in box 260, so that Last Action is set at Hold and Render Level is maintained at 5. Then, in cycle 7, box 252 obtains a value of 3 for Current Rating, so that the step in box 270 determines that Render Level is greater than Current Rating. Since cycle 6 set Last Action to Hold, the step in box 274 in cycle 7 sets Hold Level to zero for cycle 8. Then the step in box 276 sets Last Action to the value More Detailed and decrements Render Level for cycle 8 to the value 4.

Cycle 8 begins with the values set by cycle 7, and the step in box 252 obtains a value of 4 for Current Rating. Therefore, the step in box 290 sets Last Action to the value Equal; maintains Render Level at the value 4 for cycle 9; updates Hold Level to the value 4 for cycle 9, equal to Render Level; and updates Hold Rating to 4, equal to Current Rating.

Cycle 9 begins with the values set by cycle 8, and may begin a series of cycles that maintain Render Level at the value 4. Because the step in box 260 finds Render Level equal to Hold Level and Current Rating equal to Hold Rating, the step in box 262 sets Last Action to the value Hold and maintains Render Level.

As can be seen from FIG. 7, the technique of FIG. 6 can be thought of as a high-water mark governor. When rendering at a level of detail becomes too slow, the technique goes to a simpler level and holds the simpler level. When a change occurs that makes rendering at the simpler level too slow or too fast, the technique stops holding and goes to a still simpler level or a more detailed level, whichever is appropriate. In response to a slow rendering speed, the technique can shift to a very simple level, then step to more detailed levels until the level matches the rendering speed, specifically a level selected by the developer for that rendering speed. It is important to be able to stop holding in interactive animation, because unanticipated scene and viewpoint changes requested by a user frequently affect the level of detail that can be satisfactorily rendered.

4. Software Product Features

Figure 8:
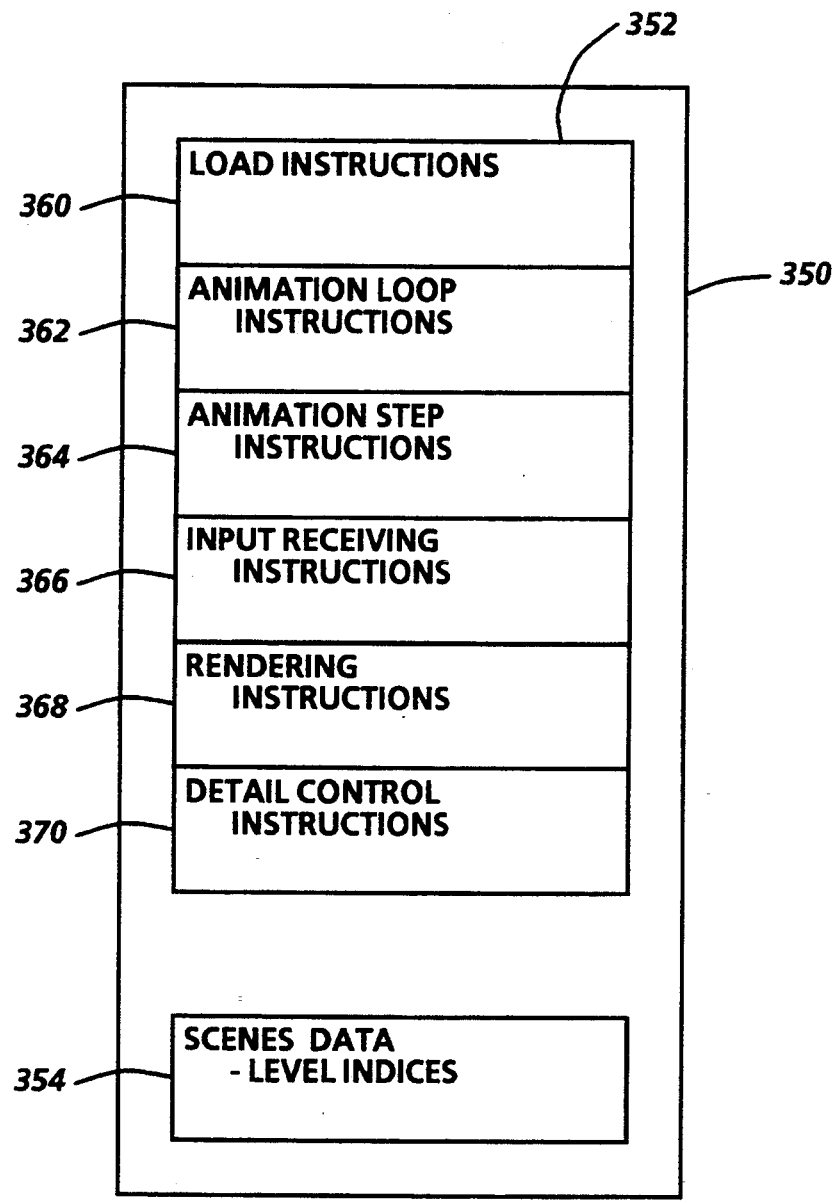
FIG. 8 is a schematic drawing of a software product that includes instructions that avoid oscillation.

A software product that includes instructions implementing the technique of FIG. 5 or the technique of FIGS. 6 and 7 can be used in a system as illustrated in FIG. 4. FIG. 8 shows an example of such a software product.

Software product 350 in FIG. 8 includes data storage medium 352, which could be a floppy disk, a CD-ROM, magnetic tape, or another medium that can store data. Medium 352 stores scenes data 354, including level indices provided by an animation designer, and instructions that can be executed in relation to scenes data 354.

In the implementation shown in FIG. 8, the instructions include load instructions 360, animation loop instructions 362, animation step instructions 364, input receiving instructions 366, rendering instructions 368, and detail control instructions 370. Except for load instructions 360, these instructions are as described above in relation to FIG. 4.

Load instructions 360 can include a routine that processor 152 executes to load scenes data 354 into data memory 162. This routine returns data for accessing data defining scenes within scenes data 354. Processor 152 may also load the instructions on medium 352 into instruction memory 160 before execution.

D. Applications

The invention could be applied in many ways to the rendering of a wide variety of scenes. For example, the invention could be used with any conventional animation techniques, such as those described by Foley, J. D., van Dam, A., Feiner, S. K., and Jughes, J. F., *Computer Graphics—Principles and Practice*, 2d Ed., Addison-Wesley, Reading, Mass., 1990, pp. 1057–1081.

The detail/speed scale described above and illustrated in FIG. 7 can be used by developers of interactive animations in developing object models. A range of models can be developed for each object in an interactive animation, with a fully detailed model rated 1 and with a range of simpler models for higher ratings. Since a developer typically knows the properties of objects that are essential for a particular animation and the properties that can be omitted when necessary to maintain animation rates, the developer should not have difficulty assigning ratings to models with different properties.

The above-cited article by Bergman et al. illustrates how an object can have a range of models of differing detail. Also, Clark, J. H., "Hierarchical Geometric Models for Visible Surface Algorithms," *Communications of the ACM*, Vol. 19, No. 10, October 1976, pages 547–554, describes alternative models for different levels of complexity. Also, Foley et al., at pages 340–341, describe elision techniques including pruning, which eliminates substructures outside the view volume; culling, which eliminates substructures below a minimum extent size; and level-of-detail elision, which gives the user control over the amount of detail presented.

A practical example of how ratings can be assigned to models arises in relation to techniques described in copending coassigned U.S. patent application Ser. No. 07/795,238, now continued as U.S. patent application Ser. No. 08/066,311 which was issued as U.S. Pat. No. 5,295,243, entitled "Display of Hierarchical Three-dimensional Structures with Rotating Substructures," incorporated herein by reference, filed Nov. 15, 1991 as a continuation of U.S. patent application Ser. No. 07/459,010, filed Dec. 29, 1989 and now abandoned and in Robertson, G. G., Mackinlay, J. D., and Card, S. K., "Cone Trees: Animated 3D Visualizations of Hierarchical Information," Report SSL-90-79, System Sciences Laboratory, Xerox Corporation Palo Alto Research Center, April 1991, pages 1–9, incorporated herein by reference. The structures described in that application each have a hierarchy of nodes about an axis. Each node has a rectangular cards with four border lines so that visually overlapped cards do not blend together. Three of these lines can be removed from most cards without losing visual separation between cards. The top line of a card can be retained for cards above the axis and the bottom line can be retained for cards below the axis. A range of models can thus be developed by taking into account the user's viewing position. A low rating includes all the border lines, a middle rating removes lines from distant cards, and a high rating removes lines from all cards.

Numerous other ways of assigning ratings to models could be employed. The degree of photorealism, for example, could be reduced for less detailed ratings.

E. Miscellaneous

The invention has been described in relation to implementations in which each cycle determines the next cycle's level of detail and provides detail control data explicitly indicating the level. The invention could alternatively be implemented with each cycle providing detail control data that implicitly indicates the next cycle's level of detail so that each cycle, before rendering, can determine its own level of detail from the detail control data.

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a system that includes:
   a display;
   memory; the memory storing scenes data defining a set of scenes; and
   a processor connected for accessing the scenes data in the memory and also connected for controlling the display to present images;
   the method comprising a sequence of rendering steps, each rendering step comprising substeps of:
     using the scenes data to produce respective image defining data defining a respective image;
     controlling the display to present the respective image as defined by the respective image defining data;
     obtaining respective rendering speed data indicating a speed with which the substep of using the scenes data is performed; and
     using the respective rendering speed data to obtain respective detail control data for use in controlling image detail to avoid oscillation of detail;
     the substep of using the respective rendering speed data comparing the rendering speed with a threshold speed; the threshold speed being a speed above which display features in an image are perceptible as continuations of display features in a next preceding image;
   the method further comprising two or more communicating steps, each communicating step communicating data between a respective preceding one of the rendering steps and a respective following one of the rendering steps; each communicating step comprising a substep of storing the respective detail control data of its preceding rendering step in the memory for access during its following rendering step;
   each preceding rendering step's detail control data including:
     respective detail information indicating detail with which to present an image; and
     respective maintenance information that the processor can use to determine whether to maintain presentation of images with the indicated detail to avoid oscillation of detail;
   the respective following step's substep of using the scenes data comprising a substep of using the preceding rendering step's detail information in producing the respective image defining data;
   the respective following step's substep of using the respective rendering speed data comprising a substep of using the preceding rendering step's maintenance information in obtaining the respective detail control data;
   the sequence of rendering steps together presenting a sequence of images in which display features are perceptible as continuing from a first image of the sequence to a last image of the sequence;
   the sequence of images including a subsequence of two or more images during which presentation of images with the same detail is maintained so that oscillation of detail does not occur during the subsequence.

2. The method of claim 1 in which the scenes data include, for each of the scenes, level defining data indicating, for each of a set of levels of detail, a respective rendering of the scene; each communicating step's detail information including respective level identifying data identifying one of the levels of detail.

3. The method of claim 2 in which the subsequence of rendering steps includes first and second consecutive rendering steps and the communicating steps include a first-to-second communicating step that communicates the first rendering step's detail control data to the second rendering step; the second rendering step's substep of using the preceding rendering step's maintenance information obtaining the second rendering step's detail control data so that the first rendering step's level identifying data are the same as the second rendering step's level identifying data.

4. The method of claim 1 in which each preceding rendering step further comprises a substep of:
   using the action data to determine whether the previous rendering step reduced detail;
   using the rendering speed data to compare the rendering speed and the threshold speed to determine whether the rendering speed is slower than the threshold speed; and
   when the the previous rendering step reduced detail and the rendering speed is not slower than the threshold speed, producing the respective detail control data so that its detail information indicates the detail with which the preceding rendering step's image is presented and so that its maintenance information indicates the rendering speed.

5. The method of claim 4 in which the action data further indicates whether the previous rendering step maintained detail; each preceding rendering step further comprising a substep of:
   obtaining hold speed data indicating a hold speed;
   the substep of using the respective rendering speed data further comprising:
     when the previous rendering step did not reduce detail or the rendering speed is slower than the threshold speed, using the action data, the hold speed data, and the rendering speed data to determine whether the previous rendering step maintained detail and whether the rendering speed is approximately equal to the hold speed; and when the previous rendering step maintained detail and the rendering speed is approximately equal to the hold speed, producing the respective detail control data so that its detail information indicates the detail with which the preceding rendering step's image is presented and so that its maintenance information indicates the rendering speed.

6. The method of claim 5 in which the substep of using the respective rendering speed data further comprises:

when the previous rendering step did not reduce detail or the rendering speed is slower than the threshold speed and the previous rendering step did not maintain detail or the rendering speed is not approximately equal to the hold speed, using the rendering speed data to determine whether the rendering speed is slower than the threshold speed; and when the rendering speed is slower than the threshold speed, producing the respective detail control data so that its detail information indicates less detail than the detail with which the preceding rendering step's image is presented; when the rendering speed is not slower than the threshold speed, producing the respective detail control data so that its detail information indicates more detail than the detail with which the preceding rendering step's image is presented.

7. The method of claim 1 in which each preceding rendering step further comprises substeps of:

obtaining detail data indicating detail with which the preceding rendering step's image is presented; and obtaining first hold data indicating detail with which a first previous image was presented and a first previous rendering speed at which the scenes data were used to produce data defining the first previous image;

the substep of using the respective rendering speed data comprising:

using the detail data, the first hold data, and the rendering speed data to determine whether the detail with which the preceding rendering step's image is presented is the same as the detail with which the first previous image was presented and whether the first previous rendering speed is approximately the same as the rendering speed; and when the detail is the same and the speeds are approximately the same, producing the respective detail control data so that its detail information indicates the detail with which the preceding rendering step's image is presented and so that its maintenance information indicates that the detail is maintained.

8. The method of claim 7 in which the rendering speed data and the detail data indicate the rendering speed and the detail with which the preceding rendering step's image is presented on a detail/speed scale; the substep of using the respective rendering speed data further comprising, when the detail is not the same or the speeds are not approximately the same:

using the rendering speed data and the detail data to determine the relation between the rendering speed and the detail with which the preceding rendering step's image is presented along the detail/speed scale.

9. The method of claim 8 in which the substep of using the respective rendering speed data further comprises, when the rendering speed is slower than the detail with which the preceding rendering step's image is presented along the detail/speed scale:

producing the respective detail control data so that its detail information indicates more detail than the detail with which the preceding rendering step's image is presented and so that its maintenance information indicates that the detail is increased.

10. The method of claim 8 in which the substep of using the respective rendering speed data further comprises, when the rendering speed is faster than the detail with which the preceding rendering step's image is presented along the detail/speed scale:

producing the respective detail control data so that its detail information indicates less detail than the detail with which the preceding rendering step's image is presented and so that its maintenance information indicates that the detail is decreased.

11. The method of claim 10 in which the substep of using the respective rendering speed data further comprises, when the rendering speed is faster than the detail with which the preceding rendering step's image is presented along the detail/speed scale:

obtaining previous action data indicating whether detail was increased in a second previous image; and when the previous action data indicates detail was increased, obtaining second hold data indicating detail with which the second previous image was presented and a second previous rendering speed at which the scenes data was used to produce data defining the second previous image.

12. The method of claim 8 in which the substep of using the respective rendering speed data further comprises, when the rendering speed is equal to the detail with which the preceding rendering step's image is presented along the detail/speed scale:

producing the respective detail control data so that its detail information indicates the detail with which the preceding rendering step's image is presented and so that its maintenance information indicates that the detail is equal.

13. The method of claim 12 in which the substep of using the respective rendering speed data further comprises, when the rendering speed is equal to the detail with which the preceding rendering step's image is presented along the detail/speed scale:

producing second hold data indicating detail with which the preceding rendering step's image is presented and the rendering speed.

14. A machine comprising:

a display;

memory; the memory storing scenes data defining a set of scenes, instruction data indicating instructions, and detail control data for use in controlling image detail to avoid oscillation of detail; the detail control data including detail information indicating detail with which to present an image on the display and maintenance information for use in determining whether to maintain presentation of images with the indicated detail to avoid oscillation of detail; and a processor connected for accessing the scenes data, the instruction data, and the detail control data in the memory and also connected for controlling the display to present images;

the instruction data comprising:

rendering instruction data indicating rendering instructions that the processor executes; the processor, in executing the rendering instructions, performing operations:

that use the scenes data to produce image defining data defining an image;

that control the display to present the image as defined by the image defining data;

that obtain rendering speed data indicating a speed with which the image defining data is produced; and that compare the rendering speed with a threshold speed above which display features in an image are perceptible as continuations of display features in a next preceding image; and detail control instruction data indicating detail control instructions that the processor executes; the processor, in executing the detail control instructions, performing operations that access the detail control data:

to obtain detail data indicating detail with which to present an image;

to obtain maintenance data indicating whether to maintain presentation of images with the indicated detail to avoid oscillation of detail; and to use the rendering speed data to update the detail control data so that the detail information indicates detail with which to present a subsequent image and the maintenance information can be used in determining whether to maintain presentation of images with the detail indicated after the subsequent image to avoid oscillation of detail;

the processor, in executing the rendering instructions and the detail control instructions, presenting a sequence of images in which display features are perceptible as continuing from a first image of the sequence to a last image of the sequence; the sequence of images including a subsequence of two or more images during which the processor maintains presentation of images with the same detail so that oscillation of detail does not occur during the subsequence.

15. The machine of claim 14, further comprising a user input device for obtaining user input data indicating signals from a user; the processor being connected for receiving the user input data; the instruction data further comprising input receiving instruction data indicating input receiving instructions that the processor executes to perform operations that use the user input data.

16. The machine of claim 14 in which the scenes data comprise level defining data indicating, for a scene, a respective rendering at each of a set of levels of detail; the detail information including a level data item for indicating one of the set of levels of detail.

17. A method of operating a system that includes:
a display;
memory; the memory storing scenes data defining a set of scenes; and
a processor connected for accessing the scenes data in the memory and also connected for controlling the display to present images;
the method comprising a sequence of rendering steps, each rendering step comprising substeps of:

using the scenes data to produce respective image defining data defining a respective image;

controlling the display to present the respective image as defined by the respective image defining data;

obtaining respective rendering speed data indicating a speed with which the substep of using the scenes data is performed; and using the respective rendering speed data to obtain respective detail control data for use in controlling image detail to avoid oscillation of detail;

the method further comprising two or more communicating steps, each communicating step communicating data between a respective preceding one of the rendering steps and a respective following one of the rendering steps; each communicating step comprising a substep of storing the respective detail control data of its preceding rendering step in the memory for access during its following rendering step;

each preceding rendering step's detail control data including respective detail information indicating detail with which to present an image and respective maintenance information that the processor can use to determine whether to maintain presentation of images with the indicated detail to avoid oscillation of detail;

the respective following step's substep of using the scenes data comprising a substep of using the preceding rendering step's detail information in producing the respective image defining data; the respective following step's substep of using the respective rendering speed data comprising a substep of using the preceding rendering step's maintenance information in obtaining the respective detail control data;

each preceding rendering step further comprising a substep of:
obtaining action data indicating whether a previous rendering step reduced detail;

the substep of using the respective rendering speed data comprising:

using the action data and the rendering speed data to determine whether the previous rendering step reduced detail and whether the rendering speed is slower than a threshold speed; and when the previous rendering step reduced detail and the rendering speed is not slower than the threshold speed, producing the respective detail control data so that its detail information indicates the detail with which the preceding rendering step's image is presented and so that its maintenance information indicates the rendering speed.

18. A method of operating a system that includes:
a display;
memory; the memory storing scenes data defining a set of scenes; and
a processor connected for accessing the scenes data in the memory and also connected for controlling the display to present images;
the method comprising a sequence of rendering steps, each rendering step comprising substeps of:

using the scenes data to produce respective image defining data defining a respective image;

controlling the display to present the respective image as defined by the respective image defining data;

obtaining respective rendering speed data indicating a speed with which the substep of using the scenes data is performed; and using the respective rendering speed data to obtain respective detail control data for use in controlling image detail to avoid oscillation of detail;

the method further comprising two or more communicating steps, each communicating step communicating data between a respective preceding one of the rendering steps and a respective following one of the rendering steps; each communicating step comprising a substep of storing the respective detail control data of its preceding rendering step in the memory for access during its following rendering step;

each preceding rendering step's detail control data including:

respective detail information indicating detail with which to present an image; and respective maintenance information that the processor can use to determine whether to maintain presentation of images with the indicated detail to avoid oscillation of detail;

the respective following step's substep of using the scenes data comprising a substep of using the preceding rendering step's detail information in producing the respective image defining data;

the respective following step's substep of using the respective rendering speed data comprising a substep of using the preceding rendering step's maintenance information in obtaining the respective detail control data;

each preceding rendering step further comprising substeps of:

obtaining detail data indicating detail with which the preceding rendering step's image is presented; and obtaining first hold data indicating detail with which a first previous image was presented and a first previous rendering speed at which the scenes data were used to produce data defining the first previous image;

the substep of using the respective rendering speed data comprising:

using the detail data, the first hold data, and the rendering speed data to determine whether the detail with which the preceding rendering step's image is presented is the same as the detail with which the first previous image was presented and whether the first previous rendering speed is approximately the same as the rendering speed; and when the detail is the same and the speeds are approximately the same, producing the respective detail control data so that its detail information indicates the detail with which the preceding rendering step's image is presented and so that its maintenance information indicates that the detail is maintained to avoid oscillation of detail.

* * * * *